United States Patent
Knoll et al.

(10) Patent No.: US 8,457,841 B2
(45) Date of Patent: *Jun. 4, 2013

(54) SUSPENSION SYSTEM WITH OPTIMIZED DAMPING RESPONSE

(75) Inventors: Richard J. Knoll, Swartz Creek, MI (US); William Golpe, Taylors, SC (US); Nikolai K. Moshchuk, Grosse Pointe, MI (US); Chandra S. Namuduri, Troy, MI (US); Flavio Nardi, Ainslie (AU); Jihan Ryu, Cary, NC (US); Raviraj U. Nayak, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1075 days.

This patent is subject to a terminal disclaimer.

(21) Appl. No.: 11/939,698

(22) Filed: Nov. 14, 2007

(65) Prior Publication Data

US 2009/0062983 A1 Mar. 5, 2009

Related U.S. Application Data

(60) Provisional application No. 60/967,209, filed on Aug. 31, 2007.

(51) Int. Cl.
*G06F 19/00* (2011.01)
*B62K 25/00* (2006.01)
*F16F 9/512* (2006.01)

(52) U.S. Cl.
USPC . 701/37; 701/38; 280/124.106; 280/124.158; 280/5.5; 280/5.505; 188/266.1; 188/319.2

(58) Field of Classification Search
USPC ............... 701/37, 38; 280/124.106, 124.158, 280/5.5, 5.508, 5.515, 5.503; 188/319.2, 188/266.1; 380/124.106, 124.158, 5.5, 5.508, 380/5.515, 5.503
See application file for complete search history.

(56) References Cited

U.S. PATENT DOCUMENTS

| | | | |
|---|---|---|---|
| 2,701,714 | A | 2/1955 | Harwood, Jr. |
| 2,737,301 | A | 3/1956 | Thornhill |
| 2,856,035 | A | 10/1958 | Rohacs |
| 2,861,795 | A | 11/1958 | Blake |
| 3,115,349 | A | 12/1963 | Lerg |
| 3,164,381 | A | 1/1965 | Tuczek |

(Continued)

FOREIGN PATENT DOCUMENTS

| | | |
|---|---|---|
| DE | 19907432 A1 | 8/2000 |
| DE | 10131788 A1 | 1/2003 |
| EP | 1569810 B1 | 8/2006 |
| WO | WO 2005/037581 A1 | 4/2005 |

OTHER PUBLICATIONS

German Office Action for counterpart German patent application 102008040011.4-21, dated Dec. 7, 2009.

(Continued)

*Primary Examiner* — Ronnie Mancho (57) ABSTRACT

An analytical methodology for the specification of progressive optimal compression damping of a suspension system to negotiate severe events, yet provides very acceptable ride quality and handling during routine events. In a broad aspect, the method provides a progressive optimal unconstrained damping response of the wheel assembly with respect to the body. In a preferred aspect, the method provides a progressive optimal constrained damping response of the wheel assembly with respect to the body, wherein below a predetermined velocity a conventional damper force is retained.

4 Claims, 8 Drawing Sheets

U.S. PATENT DOCUMENTS

| | | | |
|---|---|---|---|
| 3,773,147 | A | 11/1973 | Wiebe |
| 4,185,719 | A | 1/1980 | Farris et al. |
| 5,231,583 | A * | 7/1993 | Lizell ............... 701/37 |
| 5,467,971 | A | 11/1995 | Hurtubise et al. |
| 5,531,110 | A * | 7/1996 | Ohashi et al. ............ 73/146 |
| 5,706,919 | A | 1/1998 | Kruckemeyer et al. |
| 6,161,419 | A * | 12/2000 | Langlechner ............ 73/11.08 |
| 6,415,895 | B2 | 7/2002 | Marking et al. |
| 6,502,837 | B1 * | 1/2003 | Hamilton et al. ......... 280/5.515 |
| 2006/0027954 | A1 | 2/2006 | Nesbitt et al. |
| 2006/0243548 | A1 | 11/2006 | Stein et al. |
| 2009/0062984 | A1 * | 3/2009 | Poilbout ............... 701/37 |
| 2010/0042293 | A1 * | 2/2010 | Moshchuk et al. ........ 701/37 |
| 2010/0163357 | A1 * | 7/2010 | Hunter ............... 188/319.2 |

OTHER PUBLICATIONS

U.S. Appl. No. 12/604,642, filed Oct. 12, 2009, entitled "Suspension System with Optimized Damping Response", to Nikolai K. Moshchuk, et al., and assigned to GM Global Technology Operations, Inc.

U.S. Appl. No. 12/238,078, filed Sep. 25, 2008, entitled "Methods and Apparatus for a Suspension System with Progressive Resistance", to William Golpe, et al., and assigned to GM Global Technology Operations, Inc.

Benoit Lacroix, Patrice Seers and Zhaoheng Liu, "A Passive Nonlinear Damping Design for a Road Race Car Application", SAE Paper 2006-01-1984 12 pages, dated 2006.

Miyazaki, Kiyoaki, Yasai, Hirofumi, "A study of ride improvement of the bus", JSAE Autumn Convention Nagoya, Japan Oct. 19-21, 1993, JSAE Technical Paper No. 9306714, 4 pages.

D.V. Balandin, N.N. Bolotnik and W.D. Pilkey, Review: optimal shock and vibration isolation, Shock and Vibration 5 (1998) pp. 73-87. ISSN 1070-9622, IOS Press.

U.S. Appl. No. 11/626,876, filed Jan. 25, 2007, entitled "Multistage Jounce Bumper", to Shawn G. Quinn et al., and assigned to GM Global Technology Operations.

* cited by examiner

SUSPENSION SYSTEM WITH OPTIMIZED DAMPING RESPONSE

CROSS-REFERENCE TO RELATED APPLICATIONS

The present regular patent application claims the priority benefit of provisional patent application Ser. No. 60/967,209, filed on Aug. 31, 2007.

TECHNICAL FIELD

The present invention relates to motor vehicle suspension systems, wherein the motor vehicle body is sprung in relation to each of its wheels via a respective spring-damper combination. More particularly, the present invention relates to a method for providing a progressive optimal damper response to jounce events, including those involving maximum wheel displacements.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the frame of the vehicle. In either jounce or rebound, a spring (i.e., coil, leaf, torsion, etc.) is incorporated at the wheel in order to provide a resilient response to the respective vertical movements with regard to the vehicle frame. However, in order to prevent wheel bouncing and excessive vehicle body motion, a damper (i.e., shock absorber, strut, etc.) is placed at the wheel to dampen wheel bounce. Additionally, when the limit of jounce is encountered, it is customary to provide a maximum jounce impact absorber in the form of a bumper cushion.

Figures 1, 1A, 1B:
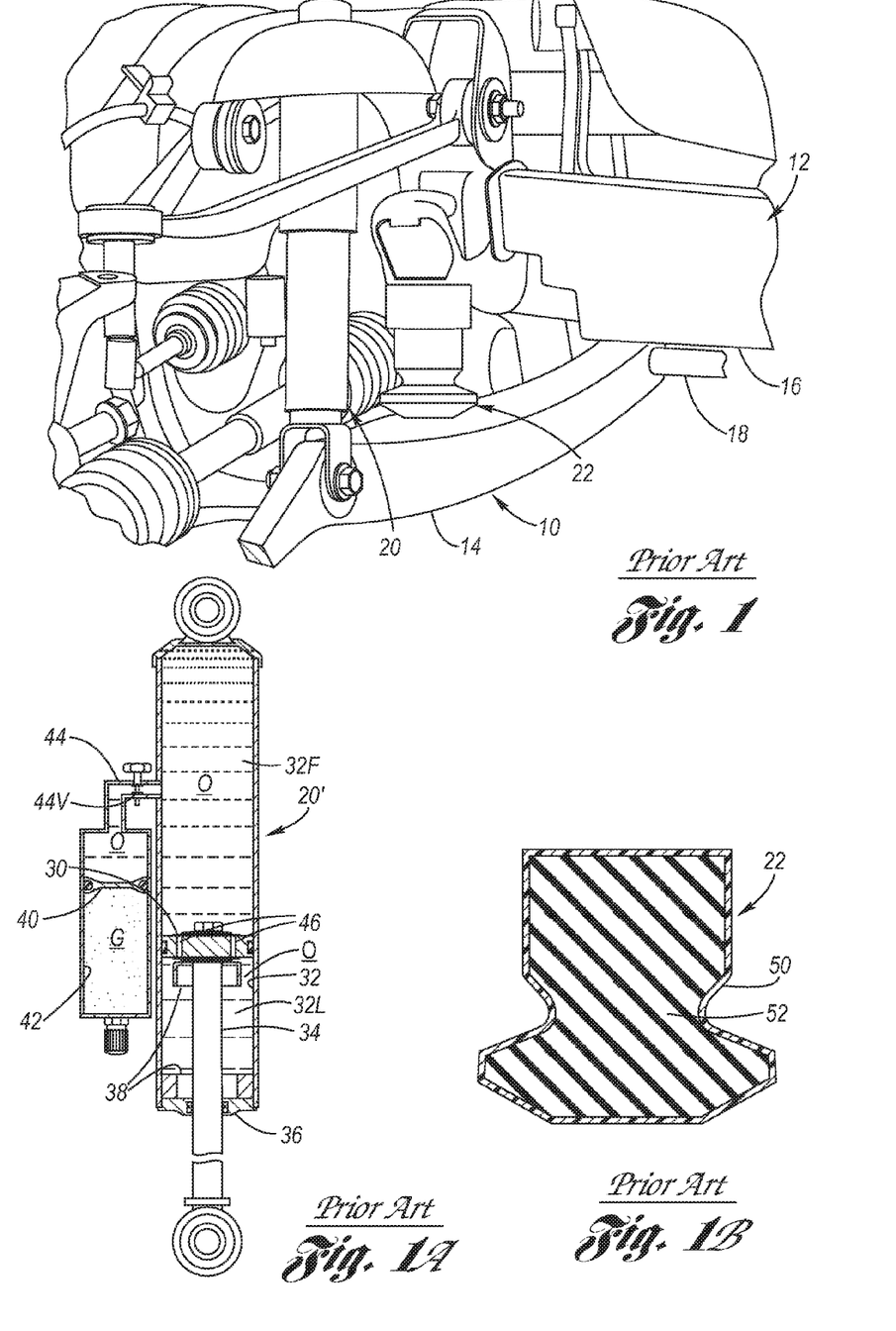
FIG. 1 is a perspective view of a conventional motor vehicle suspension system, including a control arm, a frame, a spring, a conventional shock absorber and a conventional bumper cushion.
FIG. 1A is a sectional view of a conventional shock absorber.
FIG. 1B is a sectional view of a conventional bumper cushion.

Referring now to FIGS. 1 through 1B, components of a conventional suspension system 10 are depicted which allow for jounce and rebound at a wheel of the subject motor vehicle 12.

Firstly with regard to FIG. 1, a control arm 14 is pivotally mounted with respect to the frame 16, wherein, in the depicted example, a torsion spring 18 is utilized to provide resilient response for the jounce and rebound of the control arm relative to the frame. To provide control over the rate of jounce and rebound, a damper in the form of a shock absorber 20 is connected pivotally at one end to the frame 16 and connected pivotally at the other end to the control arm 14. Alternatively, a damper in the form of a strut may be used in the suspension system, as for example disclosed in U.S. Pat. No. 5,467,971. To provide cushioning in the event a maximum jounce occurs, a jounce bumper cushion 22 is mounted to the frame 16 which is resiliently compressed by movement of the control arm as jounce approaches its maximum.

Referring next to FIG. 1A, the internal components and operational aspects of a conventional shock absorber 20' (a remote reservoir high pressure gas type shock absorber being shown merely by way of example) can be understood. A valved piston 30 is reciprocably movable within a shock cylinder 32. A shock rod 34 is attached to the valved piston 30 and is guided by a shock rod guide 36 at one end of the shock cylinder 32. Below the valved piston 30 and above the shock rod guide 36 is a mutually interacting rebound limiter 38. The instantaneous position of the valved piston 30 within the shock cylinder 32 defines a first interior portion 32F and a second interior portion 32S of the interior of the shock cylinder. In the example depicted at FIG. 1A, the pressurization in the first and second interior portions 32F, 32S is provided by an hydraulic fluid O which is pressurized by pressurized gas, preferably nitrogen, G acting on a divider piston 40 of an hydraulic fluid reservoir cylinder 42, wherein a tube 44, including a base valve 44V, connects the hydraulic fluid between the hydraulic fluid reservoir cylinder and the first interior portion. In operation, as the control arm undergoes jounce, the hydraulic fluid is displaced from the first interior portion into the hydraulic fluid reservoir cylinder, causing the pressure of the nitrogen gas to increase as its volume decreases and thereby causing an increased hydraulic pressure on the valved piston 30 in a direction toward the shock rod guide. Hydraulic fluid is able to directionally meter through valving 46 of the valved piston 30 in a manner which provides damping.

Referring next to FIG. 1B, the internal structure of a conventional jounce bumper cushion 22 can be understood. An optional skin 50 of a compliant material (i.e., having energy absorbing or damping properties) may, or may not, overlay an interior of resilient elastomeric material 52, which may be for example a rubber, rubber-like material, or micro-cellular urethane. In operation as the control arm approaches maximum jounce, the jounce bumper cushion 22 compresses, delivering a reaction force on the control arm which increases with increasing compression so as to minimize the severity of impact of the control arm with respect to the frame at the limit of jounce. Immediately following the jounce, the rebound involves the energy absorbed by the compression of the conventional bumper cushion being delivered resiliently back to the suspension.

In the art of motor vehicle suspension systems, it is known that a conventional jounce bumper cushion and related dampers can show wear. It is also known that when the energy absorbed from a particular bump or dip exceeds the capacity of a conventional jounce bumper cushion, a hard mechanical stop is engaged. This abrupt transfer of jounce force and energy to the frame manifests itself in the passenger compartment as a sharp jolt, which can create load management issues in addition to the discomfort of a rough ride. Further, in order for the frame to accept such impact loads, the structure of the frame must be engineered for an appropriate strength, which is undesirable from the standpoint of the added vehicle weight such structures must inherently entail.

Vehicle suspension engineering has traditionally focused on ride and handling as this pertains to body and wheel relative motion with respect to the body below about 1.5 m/s (meters per second). However, the suspension travel requirements in a vehicle are mainly driven by severe events which generate maximum displacements of the wheel relative to the body. These severe events, such as when the vehicle encounters a deep and steep-walled pothole, can generate wheel velocities (relative to the body) of up to 9 m/s.

An approach pursued by Bavarian Motor Works (BMW) of Munich, Germany, is described in European Patent Application EP 1,569,810 B1, published on Sep. 7, 2005; which application is parent to U.S. Patent Application publication 2006/0243548 A1, published on Nov. 2, 2006.

The object of the BMW disclosure of EP 1,569,810 B1 is to provide a vibration damping method on a motor vehicle wheel suspension by means of a hydraulic vibration damper which prevents great loads on the vehicle body and chassis caused by very large vertical velocities of the wheel, e.g., when traveling over potholes. According to the BMW disclosure, in a hydraulic vibration damper for a motor vehicle, a method of vibration damping on a wheel suspension is used by BMW, characterized in that the damping force of the vibration damper increases as a function of piston speed, especially in the piston speed range of essentially 0 to 2 m/s, at first increasing slowly, essentially linearly, and then, especially above a piston speed of essentially 2 m/s, increasing according to a highly progressive function. Further according to the BMW disclosure, through a suitable choice, design and construction of vibration damper valves or by otherwise influencing the hydraulic resistances in the vibration damper, it is possible to implement a characteristic which is generated by damping forces known from the state of the art in the piston speed range up to the end of the range that is relevant for comfort, and beyond this piston speed range, an extreme progression in the damper characteristic is induced to decelerate the accelerated masses to a greater extent.

While the BMW disclosure seeks to provide a solution to the long-standing problem of damping excessively large wheel-to-body velocities while attempting to maintain acceptable ride and handling for low velocities, the disclosure requires an ad hoc reliance upon a presupposed and essential damper curve which is devoid of any underlying physics which supports any of the curve aspects. Thus, what yet remains needed in the art is an analytical methodology to predict damping curves which truly achieve the goal of damping excessively large wheel-to-body velocities while attempting to maintain acceptable ride and handling for low velocities.

Of additional note is Japan Society of Automotive Engineers, JSAE technical paper 9306714 by Miyazaki, Kiyoaki, Yasai, Hirofumi, "A study of ride improvement of the bus", JSAE Autumn Convention Nagoya, Japan Oct. 19-21, 1993, wherein the authors confirmed that a progressive damping characteristic is effective for reducing the pitching and impact vibration.

Of further note is Society of Automotive Engineers, SAE technical paper 2006-01-1984 by Benoit Lacroix, Patrice Seers and Zhaoheng Liu, "A Passive Nonlinear Damping Design for a Road Race Car Application", wherein a nonlinear passive damping design is proposed to optimize the handling performance of an SAE Formula car in terms of roll and pitch responses.

Progressive damping is thought of as an enabler to reduce harsh impact, ride input feel when encountering severe events through the method of maintaining a predefined load in jounce and reducing engagement into the jounce suspension stop. It is also needed to develop enablers to reduce total jounce travel so that a given vehicle could be trimmed lower to enable competitive styling cues. Trimming a vehicle lower usually increases the level of harshness for an event such as a deep pothole and other severe events.

What remains needed in the art, therefore, is an analytical methodology for the specification of progressive optimal compression damping that enables the suspension to negotiate severe events with reduced harshness, yet provides very acceptable ride quality and handling during routine events, limits peak loads on the fame structure, reduces wheel travel, and enables lower trim height.

SUMMARY OF THE INVENTION

The present invention is an analytical methodology for the specification of progressive optimal compression damping that enables a motor vehicle suspension system to negotiate severe events, such as potholes, with reduced harshness, yet provides very acceptable ride quality and handling during routine events, such as common road surfaces, limits peak loads on the frame structure, reduces wheel travel, and enables lower trim height.

In a broadest aspect of the present invention, a method is provided for a progressive optimal unconstrained damping response of the wheel assembly with respect to the body. In a preferred aspect of the present invention, a method is provided for a progressive optimal constrained damping response of the wheel assembly with respect to the body.

The method to provide a progressive optimal unconstrained damping response of the wheel assembly with respect to the body is generated from equations of motion of the wheel center of the wheel assembly with no initial external forces, no initial displacement, and the total force acting on the wheel center is essentially constant (hereafter referred to simply as "constant total force) during the wheel center's deceleration from an initial velocity $U_0$ to a velocity of zero. The constant total force is related to a determined travel length of the wheel center such that when the wheel center is at the determined travel length, its velocity is zero, the damper force is zero and the suspension spring is compressed the determined travel length by which the suspension spring force is equal to the constant total force and when the wheel center is at zero displacement its velocity is $U_0$, the suspension spring is uncompressed with respect to equilibrium by which the suspension spring force is zero, and the damper force is equal to the constant total force. With the above conditions, the amount of energy dissipated by the damper is maximized and the total load on the body is minimized, whereby a progressive optimal unconstrained damper force is obtained which is valid for all displacements of the wheel center from zero to the predetermined travel length and velocities from $U_0$ to zero.

The suspension spring may include coil spring, jounce bumper, mounts, and other suspension compliances. Suspension spring force as a function of wheel center travel can be determined in the lab through the standard technique, where the tire patches are actuated vertically in jounce and rebound while the force is measured through the force tables and wheel transducer systems.

In practice, a predetermined damper force acting on the wheel center below a wheel center velocity $u_1$, approximately 2.0 m/s, is based on ride and handling considerations for a given vehicle or vehicle model according to the prior art methodology, and should not be altered therefrom. A method to provide a progressive optimal constrained damping response of the wheel assembly with respect to the body, in which the predetermined damper force acting on the wheel center below or equal to a wheel center velocity of $u_1$, approximately 2.0 m/s, is not altered, is generated as described below:

1. A progressive optimal constrained damper force is obtained from equations of motion of the wheel center with no initial external forces, an initial displacement $x_0$ when the initial velocity is $U_0$, and the total force acting on the wheel center is constant during the wheel center's deceleration from a velocity $U_0$ to an empirically determined velocity $u_2$. The constant total force acting on the wheel center is related to equations of motion of the wheel center and predetermined vehicle parameters.

2. A smooth, continuous damping force transition function is obtained, preferably approximating a step function, producing a damping force from the wheel center velocity $u_1$ to an empirically determined wheel center velocity $u_2$ greater than $u_1$, but neighboring, $u_1$.

3. The predetermined damper force acting on the wheel assembly is used below or equal to a wheel assembly velocity $u_1$.

The constant total force is related to a determined travel length of the wheel center such that when the wheel center is at the determined travel length, its velocity is zero, the damper force is zero and the suspension spring is compressed the determined travel length by which the suspension spring force is equal to the constant total force and when the wheel center is at displacement $x_0$ its velocity is $U_0$, the suspension spring is compressed by $x_0$.

With the above conditions, the amount of energy dissipated by the damper is maximized and the total load on the body is minimized whereby a progressive optimal constrained damping function is obtained valid for all displacements of the wheel center from zero to the determined travel length and velocities from $U_0$ to zero.

Accordingly, it is an object of the present invention to provide an analytical methodology for the specification of progressive optimal compression damping that enables a motor vehicle suspension system to negotiate severe events, such as potholes, with reduced harshness, yet provides very acceptable ride quality and handling during routine events, such as common road surfaces, limits peak loads on the frame structure, reduces wheel travel, and enables lower trim height.

This and additional objects, features and advantages of the present invention will become clearer from the following specification of a preferred embodiment.

DESCRIPTION OF THE PREFERRED EMBODIMENT

Referring now to the Drawing, FIGS. 2 through 9 depict various aspects of the methodology according to the present invention to provide optimized damping in a motor vehicle suspension system.

Generally speaking, the performance of motor vehicles under severe road events is tested using a pavement which includes a series of potholes. For example, a minor pothole would be a shallow pit, and more pronounced pothole would be a deeper pit capable of causing passengers to feel a bounce; and a "severe event" pothole would be a box-shaped drop-off pit with a hard, square edge at the back.

The following analysis is focused on motor vehicle suspension response to traversal of a "severe event" pothole. During a "severe event" pothole traversal, the wheel first falls into the pothole, followed by the falling body corner, and then, in an already jounced position (compared to nominal trim position), hits a steep bump approximating a step. Tire forces then accelerate the wheel and the suspension goes into a deep jounce. Wheel vertical velocity reaches its peak, about 5 m/s, (MKS units being used herein) sometime through the jounce travel and then decreases to zero at the maximum jounce travel (where the maximum shock tower vertical load is achieved). The deceleration portion of the jounce event (from the maximum wheel speed to zero) is modeled with the help of a one degree of freedom (1DOF) nonlinear mechanical system, as described below.

Figure 2:
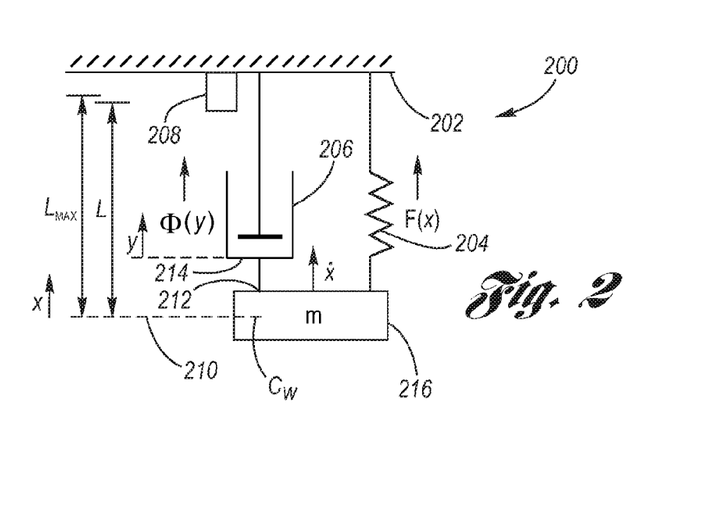
FIG. 2 is a diagrammatic view of a motor vehicle suspension system depicting a sprung mass (i.e., vehicle body), unsprung mass (i.e., wheel assembly), a spring, a damper, and a jounce bumper of a motor vehicle.

FIG. 2 is a diagrammatic view 200 of a vehicle suspension system, typically used in the art, depicting the relationship of predetermined sprung mass 202 (i.e., the vehicle body), predetermined unsprung mass m (i.e., the wheel assembly), nonlinear predetermined spring 204, nonlinear damper 206 (i.e., shock absorber, etc.), and jounce bumper 208. Herein, the predetermined sprung mass 202 is referred to simply as the "body" wherein the body serves as the reference for measuring velocity of the unsprung mass and the predetermined unsprung mass m is referred to simply as the "wheel assembly" 216.

In FIG. 2, the velocity, $\dot{x}$, or y (i.e., $y=\dot{x}$), in the vertical direction x of the wheel center $C_w$ of the wheel assembly 216 with respect to the body 202 is related to the velocity v, in the vertical direction x with respect to the body, of the bottom 214 of damper 206 where it connects to the wheel assembly at point 212, by a predetermined ratio r such that $y=v/r$. Herein the velocity v is referred to as the damper velocity and the wheel center $C_w$ is the centerline of the wheel assembly 216.

The wheel assembly 216 is attached to the body 202 by the nonlinear predetermined spring 204 and by the nonlinear damper 206 (the jounce bumper 208 is usually independently interfaced between the wheel assembly and the body). The displacement of the wheel center with respect to the equilibrium position (nominal trim) 210 is in the vertical direction x and L is the travel length of the wheel center with respect to the equilibrium position in the vertical direction x, which could include a portion of the jounce bumper 208, and also corresponds to the compression length of the predetermined spring 204. The travel length L is less than or equal to a predetermined maximum travel length $L_{MAX}$ in the vertical direction x, as depicted merely by way of example in FIG. 2. The wheel assembly 216 and its mass m, predetermined travel length L, the predetermined maximum travel length $L_{MAX}$, the spring 204, the body 202, and predetermined ratio r are empirically or analytically determined for a particular vehicle or vehicle model by the vehicle manufacturer.

The equation of motion with no external forces acting on the wheel center $C_w$ has the following form with the given initial conditions:

$$m\ddot{x}+F(x)+\Phi(\dot{x})=0, x(0)=x_0, \dot{x}(0)=U_0 \quad (1)$$

wherein x is the displacement of the wheel center with respect to the equilibrium position 210, $\dot{x}$ or y (i.e., $y=\dot{x}$) is the wheel center velocity with respect to the body 202, $\ddot{x}$ is the wheel center acceleration with respect to the body, $\Phi(\dot{x})$ is the damper force of the damper 206 as a function of wheel center velocity $\dot{x}$, $F(x)$ is the suspension spring force of the spring 204 acting on the wheel center $C_w$ at the displacement x corresponding to a compression of the spring by a displacement x, $x(0)$ is the position of the wheel center at time $t=0$ with respect to the equilibrium position 210, $x_0$ is the initial position of the wheel center at time $t=0$ with respect to the equilibrium position 210, $\dot{x}(0)$ is the velocity of the wheel center with respect to the body 202 at time $t=0$, the travel length L is predetermined, and $U_0$ is a predetermined initial velocity of the wheel center with respect to the body at time $t=0$. In reality, suspension ride spring and damper are not collocated and wheel center vertical travel is not equal to the damper (shock) displacement. Given the predetermined ratio of damper (shock) travel per unit of vertical wheel center travel, r, $y=v/r$, wherein v is the damper (shock) velocity, and a predetermined initial damper velocity $V_0$, $U_0$ can be calculated from $U_0=V_0/r$.

For the system 200 described by equation (1), assuming the velocity $\dot{x}=y=0$ when $x=L \leq L_{MAX}$, the suspension spring force F(x) of the spring 204 acting on the wheel center $C_w$ is equal to F(L). If the total force, $F(x)+\Phi(\dot{x})$ acting on the wheel center $C_w$ during its deceleration from $U_0$ to 0 is constant and equal to F(L), then the amount of energy dissipated by the damper 206 is maximized, and the total load on the body 202 is minimized. This leads to the following condition:

$$F(x)+\Phi(y)=F(L)=\text{constant} \quad (2)$$

valid for $0 \leq x \leq L \leq L_{MAX}$, and $0 \leq y \leq U_0$ where $\Phi(y)=\Phi(\dot{x})$ represents a smooth, continuous, and monotonically increasing progressive optimal unconstrained damper force of damper 206 as a function of wheel center velocity y.

For initial conditions of the wheel center $C_w$ being $x(0)=x_0=0$ and $\dot{x}(0)=U_0$, when the total force acting on the wheel center during its deceleration from a velocity of $U_0$ to 0 is constant and equal to F(L) and the progressive optimal unconstrained damper force $\Phi(y=0)=0$, then the progressive optimal unconstrained damper force $\Phi(y)$ as a function of wheel center velocity y of equation (2) can be expressed as:

$$\Phi(y) = F(L) - F\left(\left(1 - \frac{y^2}{U_0^2}\right)L\right) \quad (3)$$

whereby $0 \leq y \leq U_0$ and, $$\frac{m * U_0^2}{2} = L * F(L) \quad (4)$$

which represents a kinetic energy constraint and wherein "*" represents a multiplication symbol.

The function $$F\left(\left(1 - \frac{y^2}{U_0^2}\right)L\right)$$

is the suspension spring force of the spring 204 acting on the wheel center $C_w$ when the wheel center velocity is y where $0 \leq y \leq U_0$.

Since $y=v/r$ and $U_0=V_0/r$, using equation (3), a progressive optimal unconstrained damper force $\Psi_1(v)$ as a function of damper velocity v can be expressed as:

$$\Psi_1(v) = \frac{\Phi(y=v/r)}{r} \quad (5)$$

or equivalently as:

$$\Psi_1(v) = \frac{F(L) - F\left(\left(1 - \frac{v^2}{V_0^2}\right)L\right)}{r}. \quad (6)$$

The function $$F\left(\left(1 - \frac{v^2}{V_0^2}\right)L\right)$$

is the suspension spring force of the spring 204 acting on the wheel center $C_w$ when the damper velocity is v where $0 \leq v \leq V_0$.

Figure 3:
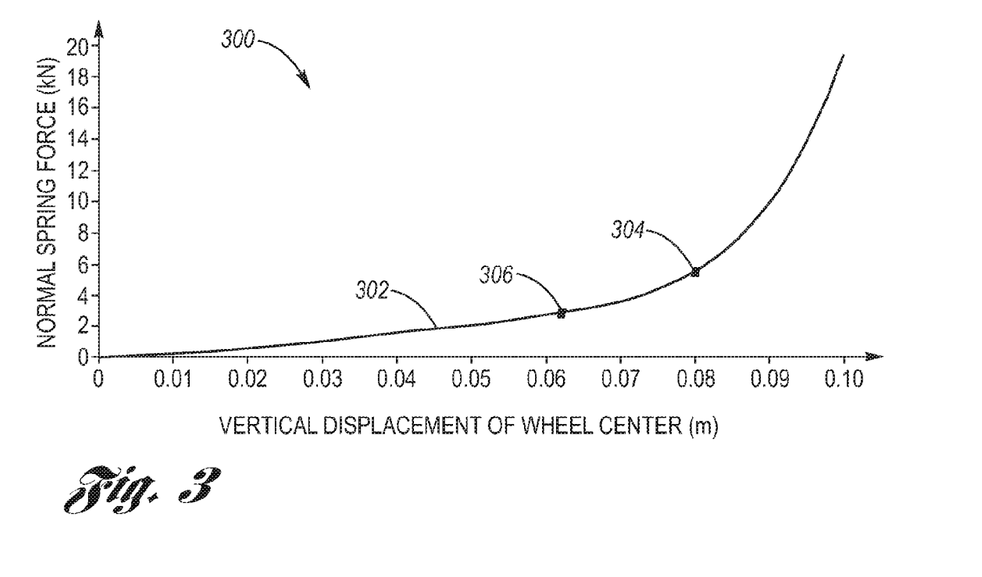
FIG. 3 is a graph of a plot of suspension spring normal force versus wheel center displacement for a representative motor vehicle.
Figure 4:
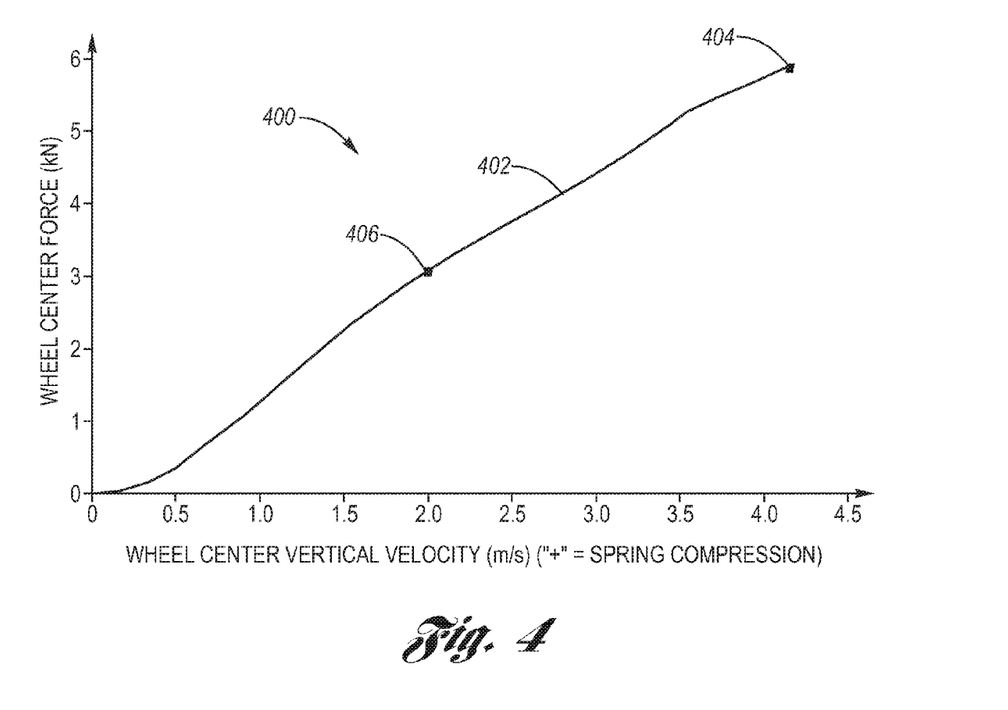
FIG. 4 is a graph of progressive optimal unconstrained damping force at the wheel center versus wheel center vertical velocity for the representative motor vehicle of FIG. 3 according to the present invention.

An example of implementation of the foregoing will now be detailed with respect to FIGS. 3 and 4, wherein FIG. 3 is a graph 300 of a plot 302 of suspension spring normal force versus wheel center displacement for a representative motor vehicle; and FIG. 4 is a graph 400 of progressive optimal unconstrained damper force $\Phi(y)$ versus wheel center vertical velocity, plot 402, for the representative motor vehicle of FIG. 3 according to the present invention.

Given the wheel assembly mass m and the velocity $U_0$, the travel length L can be determined from the kinetic energy constraint of equation (4) as follows: A graph of the product of spring displacement x times suspension spring force F(x) (i.e., xF(x)) versus spring displacement x for the predetermined spring 204 is plotted. The point on the x axis of the plot whereat the xF(x) axis equals $$\frac{m * U_0^2}{2}$$

corresponds to the predetermined travel length L where $L \leq L_{MAX}$ wherein $U_0$ is chosen such that $L \leq L_{MAX}$. Then F(L) can be ascertained from a graph (as per FIG. 3) of a plot of suspension spring force F(x) versus spring displacement x for the predetermined spring 204. The quantity $$\left[\left(1 - \frac{y^2}{U_0^2}\right)L\right]$$

in equation (3) can be evaluated for a velocity y, where $0 \leq y \leq U_0$, by which the suspension spring force $$F\left(\left(1 - \frac{y^2}{U_0^2}\right)L\right)$$

of the predetermined spring 204 can be obtained from the graph of suspension spring force F(x) versus spring displacement x of the predetermined spring (i.e., FIG. 3). The progressive optimal unconstrained damper force Φ(y) as a function of wheel center velocity y of the damper 206 can now be determined from equation (3). A plot of the progressive optimal unconstrained damper force Φ(y) versus y can subsequently be obtained and plotted using equation (3) for various values of y.

Alternatively to the immediately above paragraph, given a travel length L, F(L) can be ascertained from a graph (as per FIG. 3) of a plot of suspension spring force F(x) versus spring displacement x for the predetermined spring 204. Velocity $U_0$ can be determined from equation (4). The quantity $$\left[\left(1 - \frac{y^2}{U_0^2}\right)L\right]$$

in equation (3) can be evaluated for a velocity y, where $0 \leq y \leq U_0$, by which the suspension spring force $$F\left(\left(1 - \frac{y^2}{U_0^2}\right)L\right)$$

of the predetermined spring 204 can be obtained from the graph of suspension spring force F(x) versus spring displacement x of the predetermined spring (i.e., FIG. 3). The progressive optimal unconstrained damper force Φ(y) as a function of wheel center velocity y of the damper 206 can now be determined from equation (3). A plot of the progressive optimal unconstrained damper force Φ(y) versus y can subsequently be obtained and plotted using equation (3) for various values of y.

For example, in FIG. 4 m=55.5 kg, $L_{MAX}$=0.095 m, L=0.081 m, $V_0$=2.7 m/s, and r=0.65 from which $U_0$=2.7/0.65 m/s=4.1538 m/s. From point 304 of FIG. 3, F(L) is, approximately, 5.9 kN for L=0.081 m corresponding to point 404 of FIG. 4, where $U_0$=4.1538 m/s which agrees with equation (3) where Φ($U_0$)=F(L). For a wheel center velocity of, for example, y=2 m/s, the quantity $$\left[\left(1 - \frac{y^2}{U_0^2}\right)L\right] = 0.062 \text{ and}$$

$$F\left(\left(1 - \frac{y^2}{U_0^2}\right)L\right)$$

from point 306 of FIG. 3 is, approximately, 2.8 kN. The progressive optimal unconstrained damper force Φ(y) from equation (3) is calculated to be, approximately, (5.9−2.8) kN=3.1 kN whereby point 406 of FIG. 4 is obtained. Subsequent points of plot 402 can be similarly obtained for various values of y.

Figure 5:
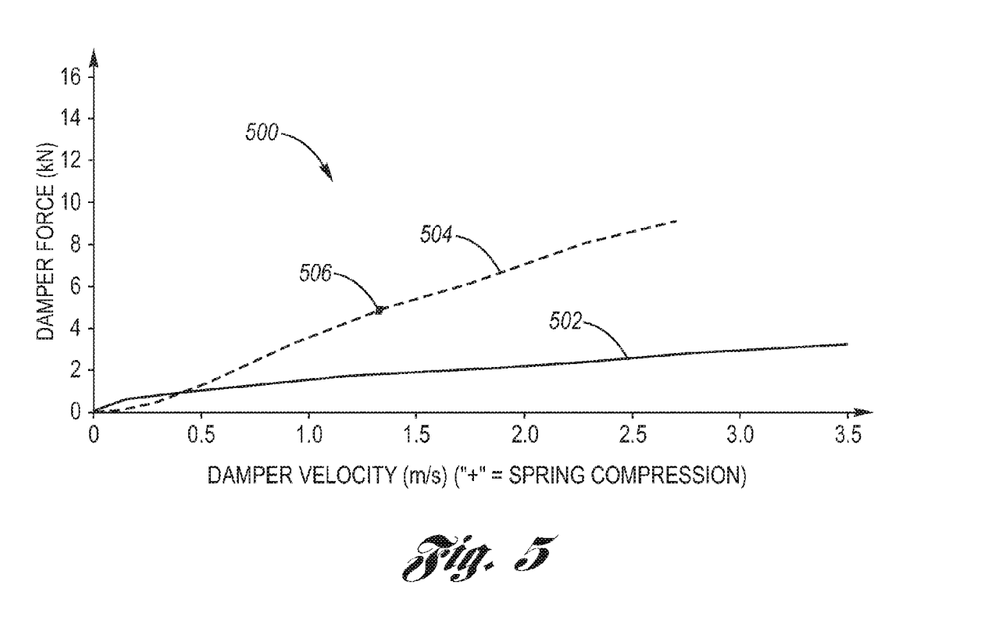
FIG. 5 is a graph of damper force versus damper velocity for the representative motor vehicle of FIG. 3, showing a first plot of damping for a conventional passive damper, and a second plot of progressive optimal unconstrained damping according to the present invention.

FIG. 5 is a graph 500 of damper force versus damper velocity for the representative motor vehicle of FIGS. 3 and 4, showing a first plot 502 of damping force for a conventional passive damper, and a second plot 504 of progressive optimal unconstrained damper force $\Psi_1(v)$ as a function of damper velocity v according to the present invention.

Given FIG. 4, $\Psi_1(v)$, plot 504, can be determined from equation (5). For example, at point 406 of FIG. 4, Φ(y) is, approximately, 3.1 kN and y=2 m/s by which v=y*r=2*0.65 m/s=1.3 m/s. From equation (5), $\Psi_1(v)$=3.1/0.65 kN=4.8 kN when v=1.3 m/s, whereby point 506 of FIG. 5 is obtained. Subsequent points of plot 504 can be similarly obtained for various values of y or v.

$\Psi_1(v)$, plot 504, can also be determined from equation (6). For example, for L=0.081 m, F(L) is, approximately, 6.1 kN from FIG. 3. For $V_0$=2.7 m/s and v=1.3 m/s, $$\left(1 - \frac{v^2}{V_0^2}\right)L = 0.062 \text{ m}$$

and F(0.062)=2.8 kN from FIG. 3. From Equation (6), with r=0.65, $\Psi_1(v)$ is calculated to be 4.7 kN whereby point 506 of FIG. 5 is obtained. Subsequent points of plot 504 can be similarly obtained for various values of y or v.

Figure 6:
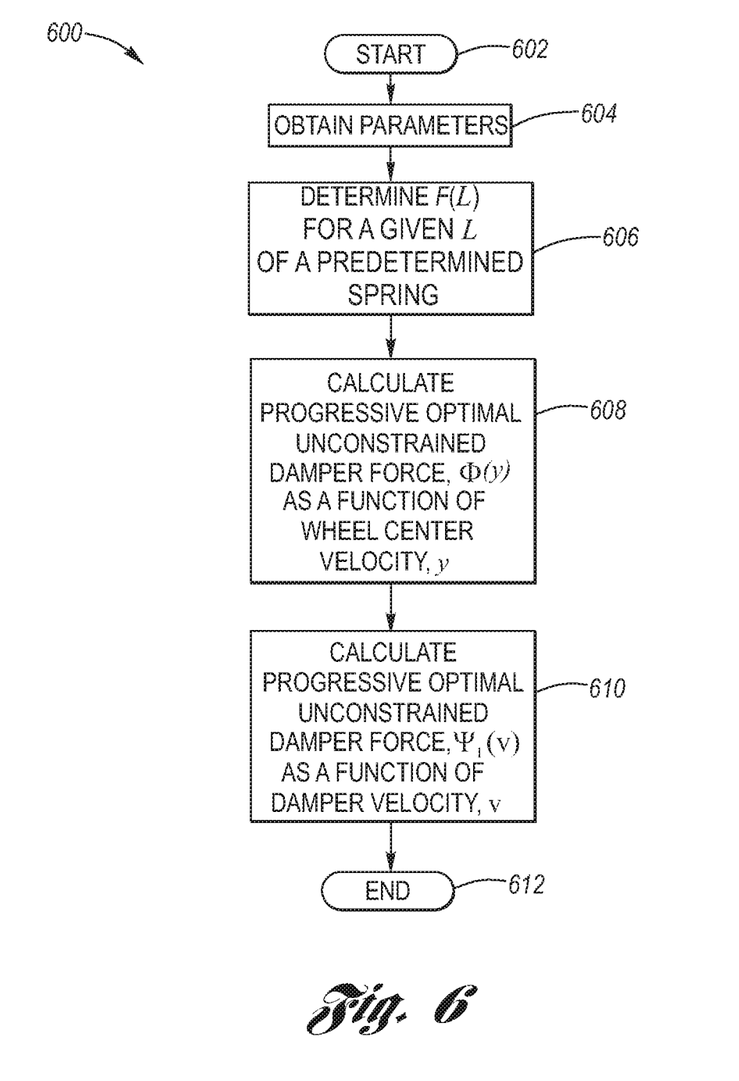
FIG. 6 is a flow chart of an algorithm for a progressive optimal unconstrained damper force according to a broadest aspect of the present invention.

FIG. 6 is a flow chart of an algorithm 600 for progressive optimal unconstrained damper force Φ(y) or $\Psi_1(v)$ according to the broadest aspect of the present invention. Algorithm 600 begins at Block 602 and then proceeds to Block 604 whereat the predetermined parameters are obtained. The predetermined parameters include, but are not limited to, m, $L_{MAX}$, r, predetermined spring 204, and $V_0$ (or $U_0$, wherein it is understood that $U_0$=$V_0$/r) or L. Control then passes to Block 606, which uses equation (4) to determine unknown $V_0$ or L, whereat F(L) is determined from L from Block 604 using the known suspension spring force versus displacement plot of the predetermined spring 204 as previously described. Control then passes to Block 608 whereat the progressive optimal unconstrained damper force Φ(y) as a function of wheel center velocity, y, is calculated and plotted using equation (3) as previously described. Control then passes to Block 610 whereat the progressive optimal unconstrained damper force $\Psi_1(v)$ as a function of damper velocity, v, is calculated and plotted using equation (5) or (6) as previously described. Control then passes to Block 612 whereat algorithm 600 ends.

As previously mentioned, in practice, a predetermined damper force φ(y) of damper 206 acting on the wheel center $C_w$ below a wheel center velocity $u_1$, approximately 2.0 m/s, is based on ride and handling considerations for a given vehicle or vehicle model as is standard in the art, and should not be altered. The unconstrained progressive optimal damper force Φ(y) obtained from equation (3), described previously, requires some modifications to yield a progressive optimal constrained damping function Ω(y), whereby the predetermined damper force φ(y) of the damper 206 acting on the wheel center $C_w$ below a wheel center velocity of $u_1$, approximately 2.0 m/s, is not altered.

If the total force, F(x)+$\Phi_1$(y), acting on the wheel center $C_w$ is a constant equal to $C_1$, then the following condition applies:

$$F(x) + \Phi_1(y) = C_1 = \text{constant} \quad (7)$$

by which a smooth, continuous, and monotonically increasing progressive optimal constrained damper force $\Phi_1(y)$ of the damper 206, as a function of the wheel center initial position $x_0$ and the wheel center velocity y, can be expressed as:

$$\Phi_1(y) = C_1 - F\left(\frac{U_0^2 - y^2}{2C_1}m + x_0\right), \quad y \geq u_2 \qquad (8)$$

where $x(0)=x_0 \leq L \leq L_{MAX}$ $\dot{x}(0)=U_0$, $\dot{x}(t_1)=U_2$, and $y=\dot{x}$. $F(x)$ in equation (7) is the suspension spring force of the predetermined spring 204 acting on the wheel center $C_w$ for a spring displacement x, $C_1$ is a constant total force acting on the wheel center, and $u_2$ is an empirically determined velocity of the wheel center, at time $t=t_1>0$, greater than, but neighboring, $u_1$. As an example, if $u_1$ is 2.0 m/s, then $u_2$ may be 2.69 m/s.

Velocity $u_2$ is empirically determined such that the transition from the predetermined damper force $\phi(y)$ at a velocity $u_1$ to the progressive optimal constrained damper force $\Phi_1(y)$ at a velocity $u_2$ is a damping force produced by a damping force transition function. In practice, the damping force transition function is smooth, continuous, and monotonically increasing from $u_1$ to $u_2$ and, preferably, approximates a step function. The closer $u_2$ is to $u_1$ the better the approximation to a step function and the lower the total load on the sprung mass 202. However, $u_2$ should not be chosen too close to $u_1$ in order to avoid an abrupt change in the damping function $\Omega(y)$ (to be described later), which in turn may increase loads on the sprung mass 202 for smaller potholes than the "severe event" pothole.

Thus, the progressive optimal constrained damping function $\Omega(y)$ as a function of wheel center velocity has the following form:

$$\Omega(y) = \begin{cases} \Phi_1(y) \equiv C_1 - F\left(\frac{U_0^2 - y^2}{2C_1}m + x_0\right), & y \geq u_2 \\ \text{step}(y, u_1, \varphi(y), u_2, \Phi_1(y)), & u_2 > y > u_1 \\ \varphi(y), & u_1 \geq y \geq 0 \end{cases} \qquad (9)$$

where step is a damping force transition function having a smooth, continuous, and monotonically increasing transition from $\phi(y)$ at velocity $u_1$ to $\Phi_1(y)$ at velocity $u_2$. Practically, the Haversine step function with a cubic polynomial, well known in the art, is, preferably, used as the damping force transition function.

A progressive optimal constrained damping function $\Psi(v)$ as a function of damper velocity v can be expressed as:

$$\Psi(v) = \frac{\Omega(y = v/r)}{r}. \qquad (10)$$

Figure 7A:
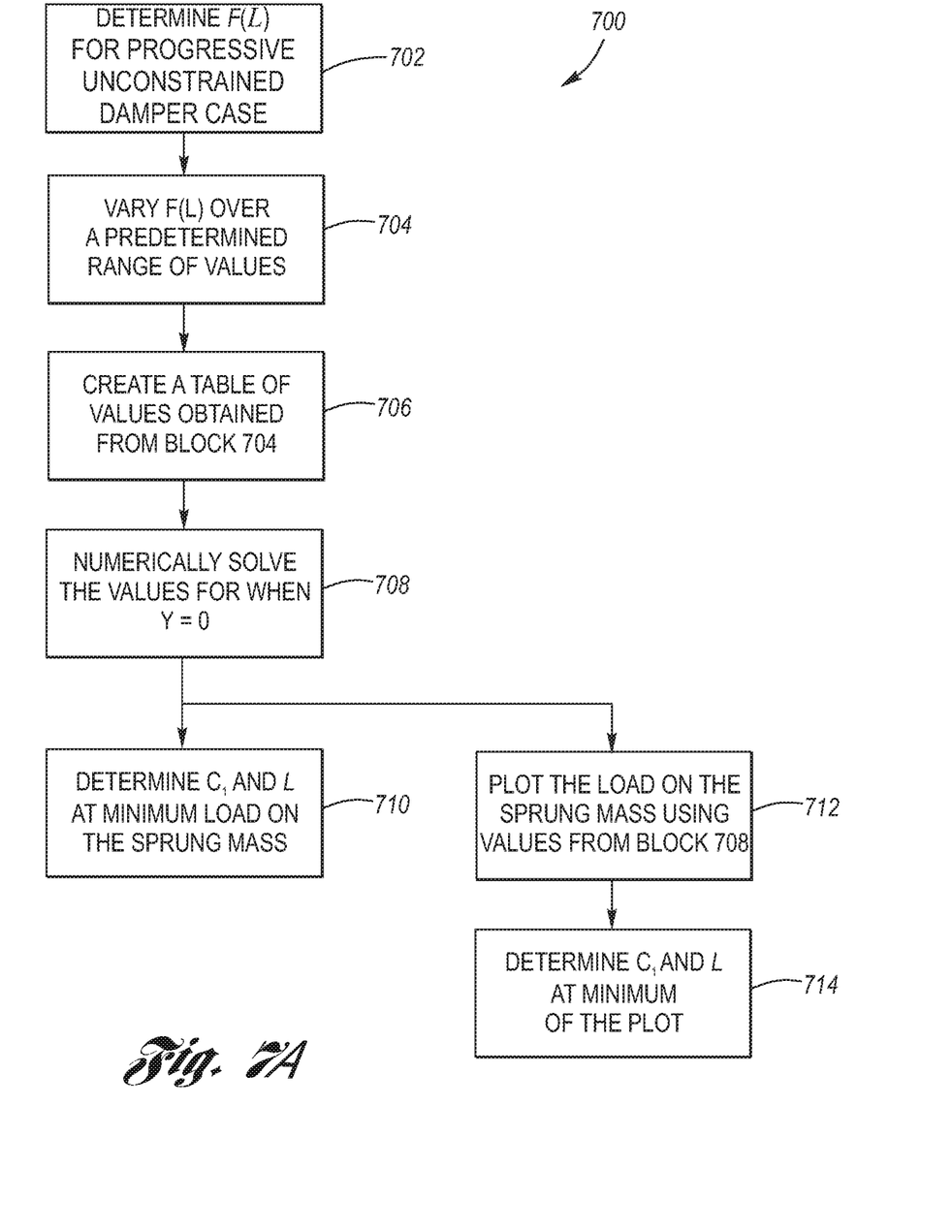
FIG. 7A is a flow chart of an algorithm to determine a constant total force for a progressive optimal constrained damping function according to a most preferred aspect of the present invention.

The constant total force $C_1$ (or constant acceleration $C=C_1/m$) is determined using the following procedure, per the algorithm 700 of FIG. 7A, wherein the equation of motion of equation (1) is numerically solved in conjunction with equation (9) for a determined $u_2$, and a minimization of the sprung mass load is determined for a time at which $\dot{x}=0$ which corresponds to $C_1$:

At Block 702, equations (2) through (4) are used to determine F(L) for the case of progressive optimal unconstrained damper force as previously described.

Next, at Block 704, F(L) is varied over an empirically determined range to obtain a $C_{1MAX}$ and a $C_{1MIN}$, for example vary F(L) by plus and minus 10% to obtain $C_{1MAX}$=F(L)+0.1F(L) and $C_{1MIN}$=F(L)−0.1F(L).

Next, at Block 706, a table is created of the variation of F(L) of Block 704, consisting of q values wherein the first entry is designated $C_{11}=C_{1MAX}$, the last value is designated $C_{1q}=C_{1MIN}$, an arbitrary entry is designated $C_{1j}$, and adjacent values are separated by an empirically determined amount, for example 50N.

At Block 708, each value in the table of Block 706 is set, starting with $C_{11}=C_{1MAX}$ and ending with $C_{1q}=C_{1MIN}$, equal to $-m\ddot{x}$ in equation (1) and numerically solved using equation (1) in conjunction with equation (9) using a particular $u_2$ for the time at which $\dot{x}=0$ or $y=0$ (i.e., $y=\dot{x}$) at which time x corresponds to the travel length of the wheel assembly and F(x) corresponds to the load on the sprung mass 202 at full jounce for that value.

In a first alternative following Block 708, at Block 710, the solved value corresponding to a minimum load on the sprung mass 202 at full jounce is designated as $C_1$ and the travel length x determined for this entry is the determined travel length $L \leq L_{MAX}$ from which F(L) may be obtained from the graph of suspension spring force F(x) versus spring displacement x of the predetermined spring 204 (i.e., FIG. 3).

In a second alternative following Block 708, at Block 712, the load on the sprung mass 202 at full jounce for each value in the table of Block 706, starting with $C_{11}=C_{1MAX}$ and ending with $C_{1q}=C_{1MIN}$, is plotted versus $C_1$ (or C, where $C=C_1/m$) wherein the point on the plot whereat a minimum load on the sprung mass 202 at full jounce occurs designates $C_1$ and the travel length x determined for this entry is the determined travel length $L \leq L_{MAX}$ from which F(L) may be obtained from the graph of suspension spring force F(x) versus spring displacement x of the predetermined spring 204 (i.e., FIG. 3).

Figure 7B:
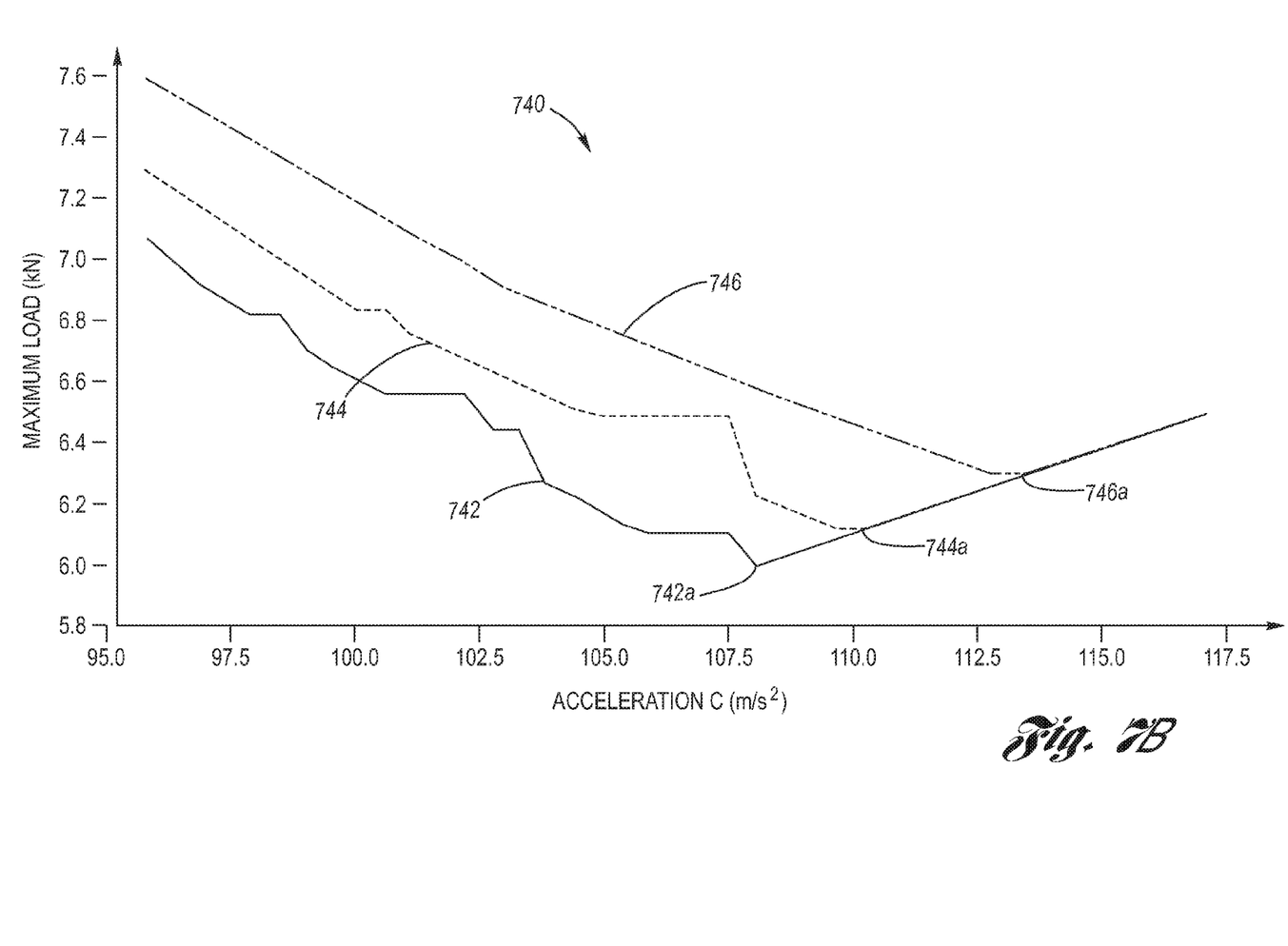
FIG. 7B is an example of a graph showing exemplar plots for carrying out the algorithm of FIG. 7A.

FIG. 7B depicts an example of a graph 740 of exemplar plots pursuant to the algorithm of FIG. 7A wherein $C=C_1/m$ and, for example m=55.5 kN. For plot 742, if $u_2$=2.31 m/s, then $C_1$ is found at point 742a, whereat C=108.1 m/s$^2$ and L=0.080 m. For plot 744, if $u_2$=2.69 m/s, then $C_1$ is found at point 744a, whereat C=110.2 m/s$^2$ and L=0.081 m. For plot 746, if $U_2$=3.08 m/s, then $C_1$ is found at point 746a, whereat C=113.4 m/s$^2$ and L=0.081 m. Other plots for different $u_2$ would be similarly evaluated.

Given $x_0$, r, $V_0$ or $U_0$, the wheel assembly m, and $C_1$, the suspension spring force $$F\left(\frac{U_0^2 - y^2}{2C_1}m + x_0\right)$$

of the predetermined spring 204 can now be determined for any $y \geq u_2$ from the suspension spring force versus displacement plot of the predetermined spring, as for example the plot of FIG. 3. The progressive optimal constrained damper force $\Phi_1(y)$ can then be obtained for any $y \geq u_2$. Thus, knowing $\phi(y)$, the step damping force transition function, and the progressive optimal constrained damper force $\Phi_1(y)$, then the progressive optimal constrained damping function $\Omega(y)$ as a function of wheel center velocity y of equation (9) can be obtained for any y where $0 \leq y \leq U_0$ by which the progressive optimal constrained damping function $\Psi(v)$ as a function of damper velocity v of equation (10) can be obtained for any v where $0 \leq v \leq V_0$.

Figure 7C:
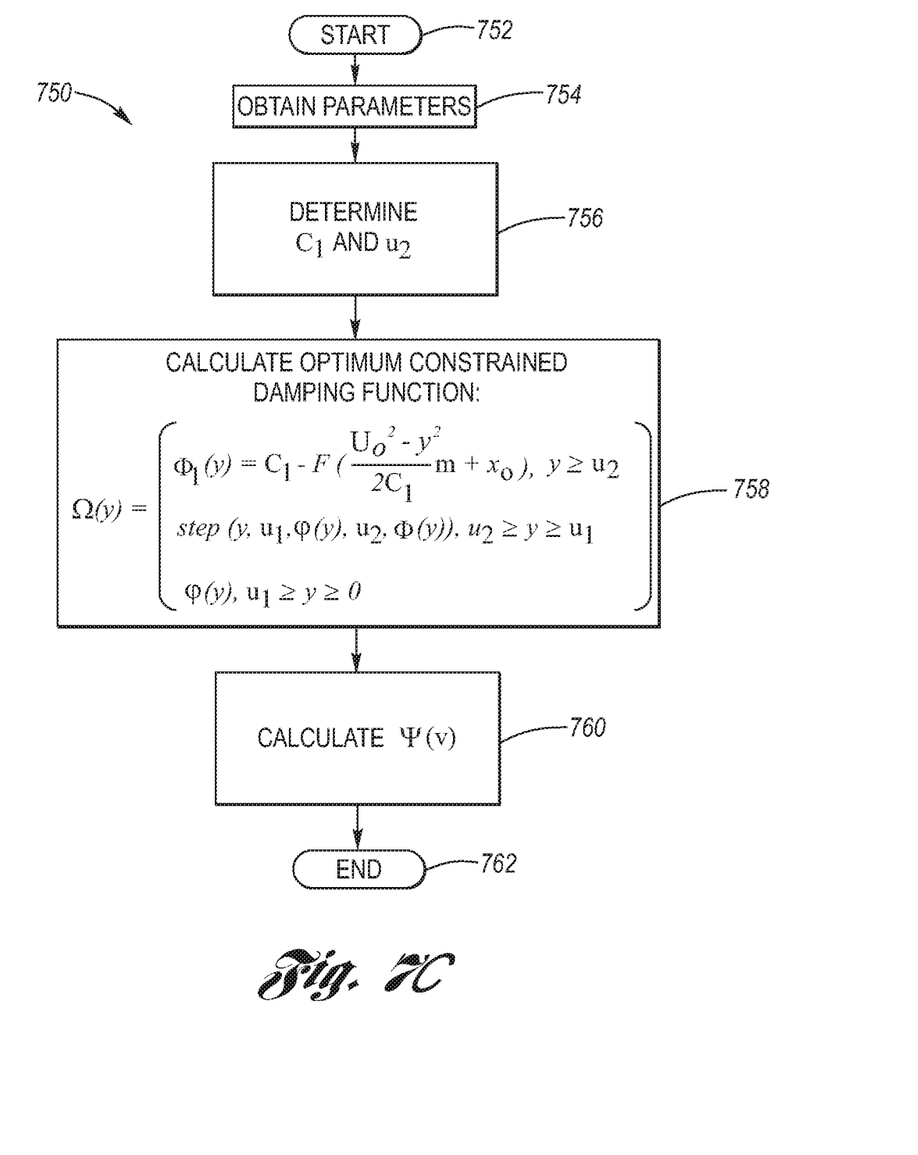
FIG. 7C is a flow chart of an algorithm for the progressive optimal constrained damping function according to a most preferred aspect of the present invention.

FIG. 7C is a flow chart of an algorithm 750 for a progressive optimal constrained damping function $\Omega(y)$ according to the preferred aspect of the present invention. Algorithm 750 begins at Block 752 and then proceeds to Block 754 whereat the predetermined parameters are obtained. The predetermined parameters include, but are not limited to, mass m of the wheel assembly 216, $L_{MAX}$, r, the predetermined spring 204, $U_0$ or $V_0$, the step damping force transition function, $\phi(y)$, $u_1$, and $x_0$.

Control then passes to Block 756 whereat $C_1$ and $u_2$ are determined as previously described. Control then passes to Block 758 whereat the progressive optimal constrained damper force $\Phi_1(y)$ as a function of wheel center velocity is calculated as previously described and the progressive optimal constrained damping function $\Omega(y)$ as a function of wheel center velocity is determined from equation (9). Control then passes to Block 760 whereat the progressive optimal constrained damping function $\Psi(v)$ as a function of damper velocity is determined from equation (10). Control then passes to Block 762 whereat algorithm 750 ends.

Figure 8:
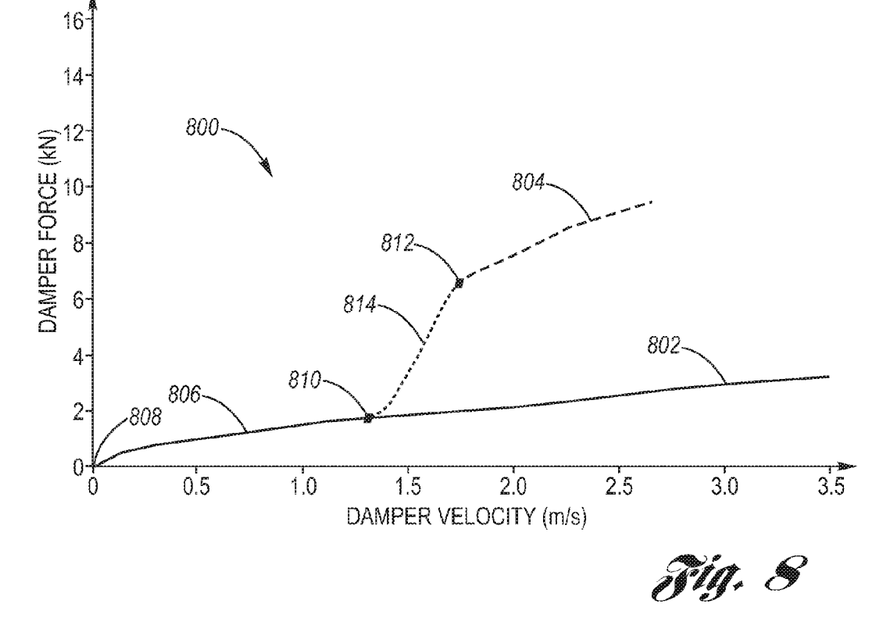
FIG. 8 is a graph of damper force versus damper velocity, showing a first plot of damping for a conventional passive damper, and a second plot of progressive optimal constrained damping according to the present invention, given the plot of FIG. 3.

FIG. 8 is a graph 800 of damper force versus damper velocity for the representative motor vehicle of FIG. 3, showing a first plot 802 of damping for a conventional passive damper, and a second plot 804 of progressive optimal constrained damping according to the present invention. In FIG. 8, m=55.5 kg, r=0.65, $C_1$=F(L)=6116 N, C=110.2 m/sec$^2$, L=0.081 m, $v_1$=1.3 m/s, $v_2$=1.75 m/s, and $V_0$=2.7 m/s. The predetermined damper force $\phi(y)$ is denoted by plot portion 806 of plot 802 extending from the origin, point 808, to point 810 at which the damper velocity $v_1$ is 1.3 m/s and wheel center velocity $u_1$ is 1.3/0.65=2.0 m/s. Fourth plot 814 is the step transition function of equation (9) from point 810 to point 812 at which the damper velocity $v_2$ is 1.75 m/s and the wheel center velocity $u_2$ is 1.75/0.65=2.69 m/s. The velocity $u_2$ is determined as previously described. The previously mentioned Haversine step function with a cubic polynomial is used as the transition function from point 810 to point 812.

Figure 9:
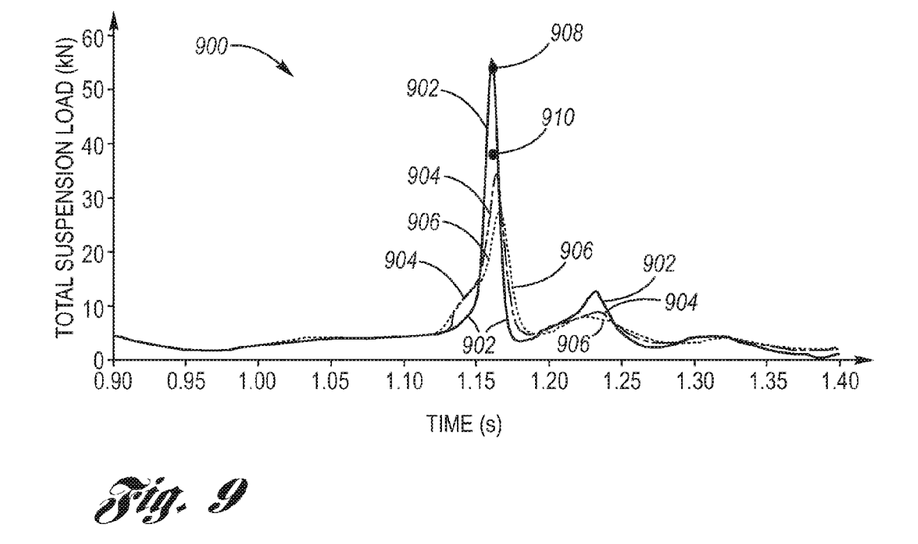
FIG. 9 is a graph of time versus total suspension load, showing a first plot of a simulated suspension load having conventional passive damping; a second plot of a simulated suspension load having progressive optimal constrained damping according to the present invention; and a third plot of a simulated suspension load having progressive optimal unconstrained damping according to the present invention.

FIG. 9 is a graph 900 of time versus total suspension load for the representative motor vehicle of FIG. 3, showing a first plot 902 of a simulated suspension load having conventional passive damping; a second plot 904 of a simulated suspension load having progressive optimal constrained damping according to the present invention; and a third plot 906 of a simulated suspension load having progressive optimal unconstrained damping according to the present invention. Point 908 depicts the experimental peak total suspension load using a conventional prior art damper. Point 910 depicts the experimental peak total suspension load using the progressive optimal constrained damping of equation (9) according to the present invention.

As used herein, by the term a "constant total force" as applied to the force collectively provided by the spring and the damper acting on the wheel assembly during jounce according to the method of the present invention is meant a force in the general neighborhood of being constant including being exactly constant, i.e., being substantially or essentially constant.

The present invention can be implemented by any suitable damper, as for example, merely by way of nonlimiting exemplification, the damper disclosed in U.S. Pat. No. 5,706,919, to Kruckemeyer et al, issued on Jan. 13, 1998 to the assignee hereof, the disclosure of which patent is hereby herein incorporated by reference. In the Kruckemeyer et al patent, it is recounted that the concept of dampers with an electrically controlled damping rate has been developed in the art wherein an algorithm is used to provide a control mechanism as a means of varying the damping force provided by a damper. Such dampers adjust the damping force in response to the control mechanism so that various performance characteristics can be provided by an individual damper. In this regard, the Kruckemeyer et al disclosure specifies that the control valve includes a movable element responsive to the control mechanism. This is typically achieved by varying the valving orifices in response to various sensors which are used to detect current real world operating conditions. In this regard, the Kruckemeyer et al disclosure further provides for the opening and closing of a control valve to be effected in a rapid and repeating manner in real time response to vehicle operating conditions via electronic control in a conventionally known manner or in response to manual selection when preferred. For more specificity, as depicted in FIGS. 1 and 2 of the Kruckemeyer et al patent, a control valve assembly includes a solenoid housing and cylindrical body. A flow path is effected through the control valve assembly between an opening provided in the side of cylindrical body and an opening provided in the end of the cylindrical body at the bottom of the piston assembly. A control valve is carried within the control valve assembly and operates to selectively open and close the flow path. The control valve is active during operation of the shock absorber, in that it is selectively positioned so that an open or closed flow path is provided between the openings. The opening and closing of the control valve is effected in a rapid and repeating manner in real time response to vehicle operating conditions via electronic control in a conventionally known manner or in response to manual selection when preferred. Thus, according to the Kruckemeyer et al disclosure, through means of the foregoing structure, a compact manner of regulating pressure by controlling the pressure drop as fluid flows from one side of the piston assembly to the other is provided. The pressure drop is modified by an electrical signal communicated to the control valve assembly, moving the control valve between open and close positions. This selectively alternates the relative damping force between the body and wheel of a vehicle to which the shock absorber is assembled through the piston assembly. Since the control valve is carried with the piston assembly instead of within the rod, the rod diameter can remain relatively small for a damper with an internal electrically variable valve.

From the foregoing description, it is seen that the method according to the present invention enables the synthesis of a non-linear compression damping curve to more effectively control the suspension behavior while driving over roads that generate maximum wheel displacements, while maintaining good ride quality on normal roads. Advantageously, the present invention provides: 1) progressive damping (by simulation and vehicle tests) to be an effective method for reducing structural load and wheel travel at high wheel velocity events (such as potholes); 2) customization for each high wheel velocity event may have a different optimal curve depending on the peak velocity, and the optimal damping curve for one event may result in increased load for other events; 3) an analytical approach based on the nonlinear one degree of freedom mechanical system can be used for generating the optimal compression damping curve that can be subsequently tuned for vehicle production; and 4) individual optimal damping curve (for a specific initial velocity) that can be used in semi-active suspension with suspension displacement/velocity sensors.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:
1. A method for providing a suspension system with optimized damper response, wherein a sprung mass is suspended by the suspension system, the suspension system including a wheel assembly having a wheel center and a mass, m, a nonlinear damper wherein the damper is connected between the sprung mass and the wheel assembly, and a spring having a predetermined spring force, F(x), as a function of displacement of the wheel relative to the sprung mass wherein the spring is connected between the sprung mass and the wheel assembly, said method comprising the steps of:
provid­ing a substantially constant total force, F(L), on the wheel assembly with respect to the sprung mass during a jounce event over a travel length of the wheel center of the wheel assembly with respect to the sprung mass, wherein the travel length extends between zero and L;
wherein the wheel center of the wheel assembly has a velocity $U_o$ relative to the sprung mass responsive to the jounce event at the travel length of zero, and wherein the wheel center of the wheel assembly has a velocity of zero responsive to the jounce event at the travel length of L; and
wherein F(L) is a combination of a damper force, $\Phi(y)$, provided by the damper and of the spring force, F(x), provided by the spring, where

$$F(x) = F\left(\left(1 - \frac{y^2}{U_0^2}\right)L\right),$$

for any wheel center velocity, y, where $0 \leq y \leq U_0$, and where the damping rate of the damper provides $$\Phi(y) = F(L) - F\left(\left(1 - \frac{y^2}{U_0^2}\right)L\right),$$

where L is given by $$\frac{m * U_0^2}{2} = L * F(L)$$

and wherein the wheel center velocity, y, responsive to the jounce event is related to a velocity, v, of the damper by a predetermined ratio, r, where y=v/r.

2. The method of claim 1, wherein the damper force is a smooth, continuous and monotonically increasing progressive optimal unconstrained damper force.

3. A method for providing a suspension system with optimized damper response, wherein a sprung mass is suspended by the suspension system, the suspension system including a wheel assembly having a wheel center and a mass, m, a nonlinear damper wherein the damper is connected between the sprung mass and the wheel assembly, and a spring having a predetermined spring force, F(x), as a function of displacement of the wheel relative to the sprung mass wherein the spring is connected between the sprung mass and the wheel assembly, said method comprising the steps of:

providing, if an initial velocity, $U_0$, of the wheel center of the wheel assembly relative to the sprung mass in response to a jounce event at an initial position, $x_0$, is less than or equal to a first predetermined wheel center velocity, $u_1$:
a predetermined force, $\phi(y)$, by the damper and the spring acting in combination on the wheel assembly with respect to the sprung mass; and
providing, if the initial velocity, $U_0$, of the wheel center of the wheel assembly relative to the sprung mass in response to a jounce event at the initial position, $x_0$, is greater than the first predetermined wheel center velocity, $u_1$:
a substantially constant total force, $C_1$, by the damper and the spring acting in combination on the wheel assembly with respect to the sprung mass during a jounce event for any velocity of the wheel center of the wheel assembly greater than or equal to a second predetermined wheel center velocity, $u_2$, where $u_2 > u_1$;
the predetermined force, $\phi(y)$, by the damper and the spring acting in combination on the wheel assembly with respect to the sprung mass for any velocity of the wheel center of the wheel assembly relative to the sprung mass in response to a jounce event in which the velocity of the wheel center in response thererto is less than or equal to the first predetermined wheel center velocity, $u_1$; and
a smooth, continuous and monotonically increasing transition force by the damper and the spring acting in combination on the wheel assembly with respect to the sprung mass for any wheel center velocity in response to the jounce event between velocity $u_1$ and velocity $u_2$; and
wherein said parameters are related by:

$$\Omega(y) = \begin{cases} \Phi_1(y) \equiv C_1 - F\left(\frac{U_0^2 - y^2}{2C_1} m + x_0\right), & y \geq u_2 \\ \text{step}(y, u_1, \varphi(y), u_2, \Phi_1(y)), & u_2 \geq y \geq u_1 \\ \varphi(y), & u_1 \geq y \geq 0 \end{cases}$$

where step is the transition force acting from $\phi(y)$ at velocity $u_1$ to $\Phi_1(y)$ at velocity $u_2$; and
wherein for a predetermined ratio, r, such that said y=v/r, where v is a velocity of the damper relative to the sprung mass, then a progressive optimal constrained damping function $\Psi(v)$ as a function of the damper velocity v is given by the relation $$\Psi(v) = \frac{\Omega(y = v/r)}{r}.$$

4. The method of claim 3, wherein:
$u_1$ generally neighbors $u_2$; and
$u_1$ is substantially equal to 2.0 m/s.

* * * * *